3,559,486
APPARATUS FOR MEASURING TEMPERATURES
IN HIGHLY VISCOUS MEDIA
Helmut Gormar, Geistinger Strasse, Hennef, Germany
Filed June 2, 1969, Ser. No. 829,391
Claims priority, application Germany, June 1, 1968,
P 17 73 549.8
Int. Cl. G01k 1/14, 7/02, 13/02
U.S. Cl. 73—359
20 Claims

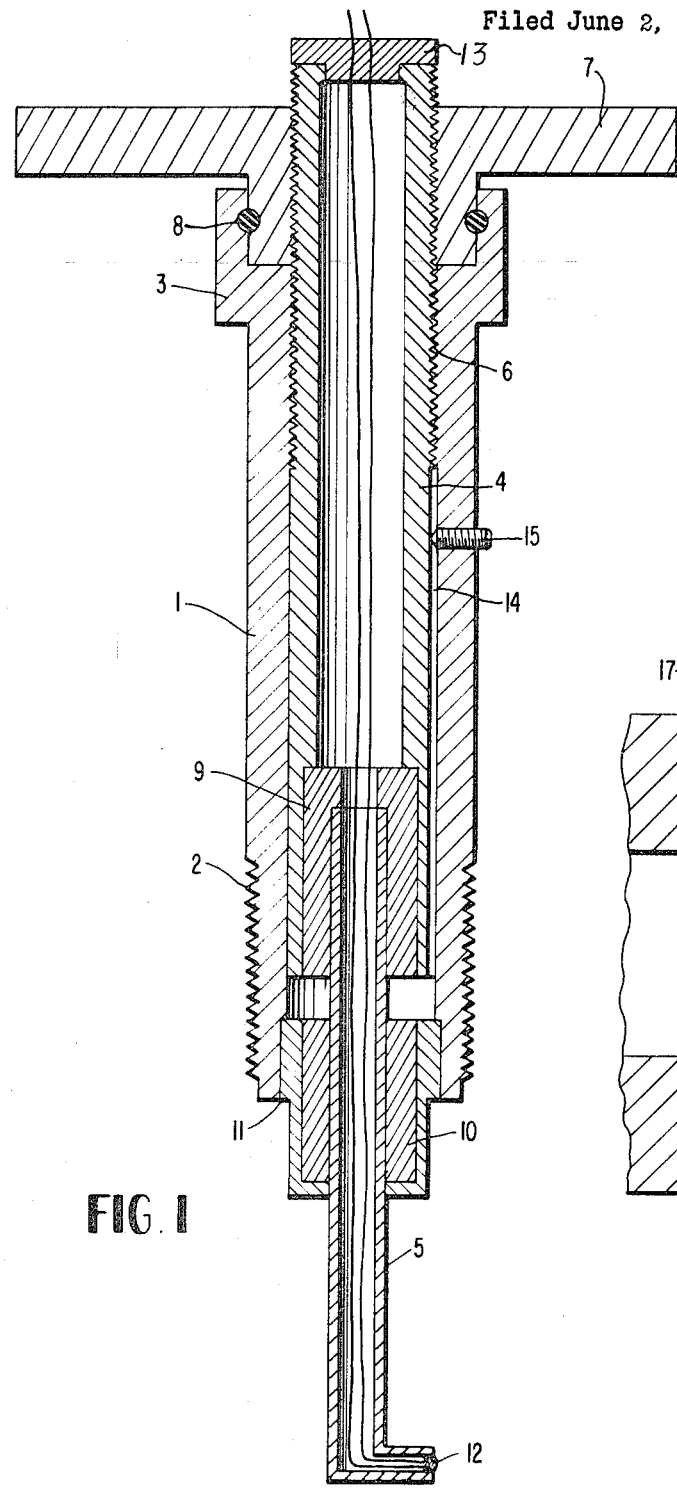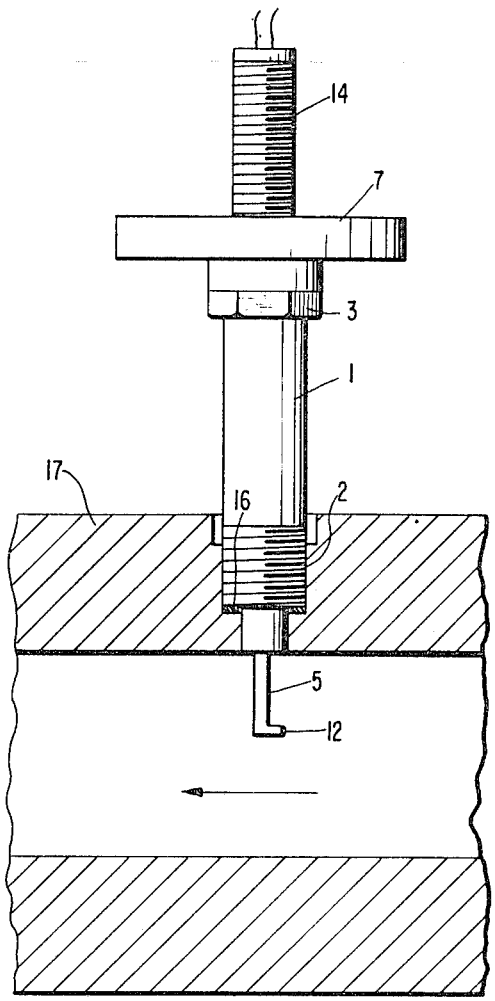

ABSTRACT OF THE DISCLOSURE

An apparatus for measuring temperatures in preferably highly viscous media, such as in a thermoplastic synthetic melt. The temperature measuring apparatus determines a radial temperature profile of a fluid flowing through a conduit using only one measuring point, by axial adjustment of a temperature sensor. Advantageously, a thermocouple or a semiconductor resistance thermometer can be used as the temperature measuring device.

BACKGROUND OF THE INVENTION

The present invention relates to an apparatus for measuring temperatures in preferably highly viscous media, for example in a thermoplastic synthetic melt. More particularly, the present invention is directed to a temperature measuring apparatus comprising a substantially cylindrical housing, one end of which contains a mounting unit and a dip pipe or immersion tube which is axially displaceable therein. The dip pipe projects from the end of the housing on the mounting unit side thereof, said dip pipe being provided at its free end with a temperature probe or sensing element, for example, a thermocouple or a semiconductor resistance thermometer.

The apparatus of the present invention serves the purpose of being able to determine the temperature distribution in the radial direction in a specific cross section of a flowing medium, so that the actual temperatures of the material can be noted and regulated by controlling the process to the optimum temperature of the material being conveyed, depending upon the economy of the process or the desired quality of the product being manufactured.

For this purpose, devices are conventional in the synthetic industry, wherein annular-cylindrical connecting element is employed, for example, disposed between a screw extruder and a tool connected therebehind. The connecting piece either carries several temperature measuring points on a web spanning the inside cross section thereof, or is provided instead with several radially oriented, straight or hook-shaped dip pipes carrying a temperature probe on their ends. However, these devices require in each case different connecting pieces in order to correspond with the connection dimensions which are different in the individual machine types. In addition, for a comparatively accurate determination of the temperature profile, for example in the case of an extruder which exhibits temperature differences of 30° C. and more, these devices necessitate a correspondingly large number of measuring points.

Furthermore, in connection with the temperature measurement in exhaust air conduits, for example air outlet ducts, a device is known wherein a dip pipe provided at one end with a temperature probe can be displaced within a pipe stub (connecting pipe) and can be held in place by means of a clamping screws (set screw). The pipe stub is fixedly attached to the conduit wall, for example, by means of a flange formed at the pipe stub. However, the use of this device is limited to measurements wherein the media are under a relatively low pressure, since the set screw must be loosened in order to displace the dip pipe within the pipe stub, and accordingly, the entire pressure resting on the dip pipe must be absorbed solely by the person operating the device, so that at higher operating pressures, the flawless displacement of the dip pipe cannot be assured.

SUMMARY OF THE INVENTION

An object of the present invention is to avoid the prior art disadvantages in measuring temperatures of a media flowing through a conduit means.

Another object of the present invention is to provide an improved apparatus for measuring temperatures in preferably highly viscous media wherein an accurate determination of a radial temperature profile using only one measuring point can be achieved.

A further object of the present invention is to provide an improved temperature measuring device which enables the accurate determination of a radial temperature profile even at high pressures and temperatures of the operating media.

A still further object of the present invention is to provide an improved apparatus for determining the temperature distribution in the radial direction is a specfic cross section of a flowing medium so that the actual temperature of said medium can be noted and regulated in accordance with the economy of the process or the desired quality of the product being manufactured.

Other objects and further scope of applicability of the present invention will become apparent from the detailed description given hereinafter; it should be understood, however, that the detailed description and specific examples, while indicating preferred embodiment of the invention, are given by way of illustration only, since various changes and modifications within the spirit and scope of the invention will become apparent to those skilled in the art from this detailed description.

Pursuant to the present invention, the accurate determination of a radial temperaure profile may be obtained by securing a dip pipe against rotational movements with respect to its housing, and connecting said dip pipe, for example by way of threads or the like, with an adjustment mechanism which is disposed at the other end of the housing in a rotatable, but axially fixed manner.

The apparatus of the present invention is attached to the wall of the flow channel, for example, by means of an outer thread or slide catch in the housing which ensures that the dip can be easily and sensitively displaced by simply rotating the adjustment device. This can be accomplished even at high pressures which, for example, in processing synthetic materials in extruders, can amount to up to about 400 atmospheres and more. The adjustment device, constructed for example as a handwheel, is in this connection secured against axial displacement relative to the housing by means of suitable form-locking connections, that is, connecting elements which are held together solely by their configuration. This is achieved, for example, by inserting round pins in the housing at right angles to its longitudinal axis, which tangentially engage an annular groove having a semicircular cross section formed on the adjustment device. Also, the annular groove of circular cross section formed by both the adjustment device and the housing is filled with balls which are introduced through a radial bore provided in the housing. The bore can be closed off, for instance, by means of a screw. Advantageously, the connection which is achieved between the dip pipe and the adjustment device, for example by means of a thread or lug-engaging cam, is designed so that the connecting element exhibits an automatic locking effect, and that accordingly, an additional securing of the adjustment device against unintended rotational displacement due to the pressure forces exerted on the dip pipe is substantially eliminated.

In order for the device to function flawlessly, it is important that the dip pipe is guided in the housing with as small amount of play as possible, so that, on the one hand, an exact easy displacement is made possible and, on the other hand, a secure seal is effected with respect to the medium, the temperature of which is to be measured. This medium is designated as the "operating medium." The seal can be more readily satisfied the higher the viscosity of the operating medium. When the device is employed to measure high temperatures, attention must be directed to the selecting of materials used for the elements which are slidingly inserted in one another. Thus, said materials should be so selected that the heat expansion values are not too different in order to avoid jamming or canting of the dip pipe due to, too large a variation in the play. Furthermore, the material of these elements as well as the materials of the other elements should exhibit the necessary mechanical strength, depending on the ambient pressures and temperatures, and should also exhibit a neutral behavior with respect to the operating medium, insofar as they come or could come into contact with said operating medium.

The temperature probe, which is constructed as a thermocouple or a semiconductor resistance thermometer is disposed on the free end of the dip pipe projecting into the operating medium by means of a neutral adhesive, cement, solder, or the like. The temperature probe is electrically and optionally also thermally insulated, as well as sealed off from the surroundings and has a strength sufficient to withstand the mechanical stress even at higher temperatures. The insulated electrical leads are guided to an indicator instrument through the dip pipe and through appropriate perforations disposed in the stopper or lid located at the other end of the device.

An essential prerequisite for the axial displaceability of the dip pipe by means of the adjustment device is that the dip pipe is secured against rotation within the housing. This can be done, for example, by guiding the dip pipe in a housing exhibitng an inside cross section corresponding thereto. The dip pipe can be formed along a portion of its length with a cross section deviating from the circular shape, for example a square cross section. However, in considering the economics of manufacturing, it is more advantageous to provide the substantially circular cylindrical dip pipe with one or optionally several longitudinal grooves on its outer surface. These grooves are uniformly distributed over the circumference of the dip pipe and are engaged by a lug, for example a threaded pin, disposed in the inner wall of the housing, optionally in a detachable manner. Moreover, such an arrangement makes it also possible to rotate the dip pipe with respect to the housing after the threaded pin has been disengaged by specific angles which can be determined by the spacing of the grooves. This is of importance when the temperature probe is not disposed within the axis of the dip pipe.

In many cases, it will prove to be advantageous, for reasons of mechanical strength as well as for the purpose of chemical neutrality, to make the dip pipe of metal, for example steel. In order to keep measuring errors caused by heat exchange with the surroundings as small as possible, it is desirable to make the dip pipe of two parts. These two parts are connected to each other with the interposition of a connecting piece having a low heat conductivity, by means of an adhesive, a threaded connection, or the like.

Another step toward an increase in measuring accuracy of the device of the present invention is obtained by reducing the diameter of the dip pipe in the zone of the end of the housing on the mounting side of the device and by guiding the dip pipe, at that point, in a bushing with a small amount of play. In addition to obtaining a decrease in the amount of heat carried away due to a reduction of the heat-conductive cross section, this measure affords the further advantage that, on the one hand, the mechanical stress on the dip pipe with respect to bending and compression is decreased and, on the other hand, the annular gap, indispensable for the flawless displacement of the dip pipe in the housing, is made smaller in diameter which ensures an improved sealing action and further opens up the possibility of still smaller gap widths at the same forces required for the displacement. In order to avoid undesired thermal (temperature) bridges in the latter case, that is with a very small amount of play with respect to the bushing, the latter can be made of a material having a low heat conductivity.

Finally, a further improvement in measuring accuracy can be obtained by constructing the dip pipe at its free end in a hook-shaped or L-shaped manner, the arrangement being selected so that the angled portion of the dip pipe extends substantially in parallel to the flow lines of the medium being conveyed and the temperature probe is disposed at the outermost end of the L-shaped portion so that it is first affected by the flow of the operating medium. Accordingly, even when there is a strong pronounced temperature profile, at least the temperature probe and an adjoining, more or less long portion of the L-shaped end portion are at the same or at least substantially the same temperature and consequently a falsification of the measuring result caused by heat conductance is avoided due to the fact that a temperature gradient is practically non-existent. In this connection, the zone of the hook congruent with the flow lines should be made longer, the larger the temperature differences in the operating medium. The criterion for the upper limit of the hook length is that the dip pipe must still be able to be passed through the bore provided for this purpose in the conduit wall.

Since the seal between the housing and the wall of the conduit is achieved by sealing rings (gaskets) of a suitable material, which is more or less strongly compressed, the dip pipe is provided, in the zone of the adjustment device, with a marking indicating the direction of the hook. Thus it is possible, in the case of a housing attached to the wall of the conduit or threaded into the conduit wall, to recognize the actual position of the hook in the flow channel. This position can then be corrected, if desired, as explained above, by rotating the dip pipe after releasing the threaded pin provided in the wall of the housing.

An absolute prerequisite for reproducible measurements is the unequivocal association between the measuring point and the measuring value. This is achieved in an effective and yet very accurate manner by providing the dip pipe and the adjustment device with a marking indicating the immersion depth of the temperature probe, for example, by using a micrometer gauge.

Of course, the displacement of the dip pipe in the conduit cross section must be conducted with due cautiousness, especially when the temperature probe is in the vicinity of the conduit wall, in order to avoid damage to the probe by forcedly pressing it against the wall of the conduit. In this connection, it is advantageous to correlate in a clearly visible manner the respectively permissible final positions of the dip pipe, which can readily be determined after installation of the measuring device by carefully displacing the dip pipe over the entire flow cross section, while making markings to indicate the immersion depth.

BRIEF DESCRIPTION OF THE DRAWINGS

The present invention will become more fully understood from the detailed description given hereinbelow and the accompanying drawings which are given by way of illustration only and thus are not limitative of the present invention and wherein, FIG. 1 shows a longitudinal section through the temperature measuring device containing a displaceable L-shaped dip pipe, according to the present invention; and FIG. 2 shows a section of a flow channel with the temperature measuring device of the present invention threadedly inserted therein.

DESCRIPTION OF THE PREFERRED EMBODIMENTS

Referring now to the drawings, wherein like reference numerals are used throughout the various views to designate like parts, the apparatus of the present invention according to FIG. 1 comprises a substantially cylindrical housing 1 provided at one end with an external thread 2 and at the other end with an external hexagon head 3 for the purpose of engaging a screw tool. A dip pipe having a circular-cylindrical cross section and containing two elements 4 and 5 is disposed within said housing. The rear element 4 of the dip pipe is dimensioned so that it is guided in the housing with a small amount of play. By way of an outer thread 6, the element 4 is connected with an adjustment device 7 constructed as a handwheel. The adjustment device 7 is rotatably disposed in the housing 1 but axially non-displaceable due to the tangentially inserted round pins 8. By means of the adjustment device 7, the element 4 can be axially shifted. The element 5, having a reduced diameter as compared to element 4, is joined to the latter by means of a connecting piece 9 composed of a mixture of a thermoset resin and asbestos, and the use of "Araldit," a two-component epoxy resin adhesive. At the end of the housing on the mounting side, the element 5 is guided in a bushing 10 made of the same material, said bushing being inserted in a cup-shaped housing 11 which is likewise connected with the main housing by cementing or optionally is also cemented thereto. On the end extending out of the housing 1, the element 5 is bent in a hook-like or L-like shape and provided at its outermost tip with a thermocouple 12 with the aid of "Araldit." The insulated lead wires of this thermocouple are extended through the interior of the dip pipe and through perforations, not shown in the sealing lid 13 disposed at the other end, to an indicator instrument, likewise not shown. Also, absent from the drawing is the indicator for the determination of the immersion depth of the dip pipe provided on the element 4, as well as the marking for indicating the hook direction or orientation, said marking being provided either on the element 4 or on the sealing lid 13. In the latter case, the sealing lid must then be inserted in the element 4 in an oriented manner. Thus, the possibility is afforded that the hook-like end can be more or less accurately aligned with respect to the flow of the operating medium, by rotating the dip pipe. This can be effected by loosening the threaded pin 15 radially disposed in the housing 1 and engaging the longitudinal grooves 14 formed in the element 4 at an angle determined by the spacing of the individual grooves 14.

In FIG. 2, the housing 1, shown in a plan view, is threadedly inserted in the bore provided for this purpose in the wall 17 of the conduit by means of the external thread 2 with the use of a sealing ring (gasket) 16. The dip pipe is oriented in such a manner that the hook, with the thermocouple 12 disposed at the tip, points upstream.

The invention being thus described, it will be obvious that the same may be varied in many ways. Such variations are not to be regarded as a departure from the spirit and scope of the invention, and all such modifications as would be apparent to one skilled in the art are intended to be included.

I claim:

1. An apparatus for measuring the temperatures of a medium flowing through a conduit which comprises an outer housing provided at one end with an external thread and at the other end with a head portion adjustment means rotatably disposed in the head portion of the outer housing but in an axially fixed manner, dip pipe means disposed within said outer housing, means for securing the dip pipe means against rotational movement relative to said outer housing, said dip pipe means having at one end an external threaded portion adapted to engage the adjustment means annularly disposed therearound for axially displacing said dip pipe means, the other end of said dip pipe means extending out of the outer housing in an L-shaped manner, the end portion of the L-shaped dip pipe means being provided with a heat-sensing means, indicator means disposed at the threaded end of the dip pipe means and insulated wires extending through the interior of the dip pipe means and providing communication between the heat sensing means and the indicator means.

2. The apparatus of claim 1, wherein head portion of the outer housing has an external hexagon shape for engaging said adjustment means.

3. The apparatus of claim 2, wherein round pins are tangentially inserted between the adjustment means and hexagon head thereby making said adjustment device axially non-displaceable.

4. The apparatus of claim 1, wherein the outer housing and the dip pipe have a substantially circular-cylindrical cross section.

5. The apparatus of claim 1, wherein the dip pipe is so dimensioned that it is disposed in the outer housing with a small amount of play.

6. The apparatus of claim 1, wherein the dip pipe is composed of two separate portions, the external threaded end portion and the L-shaped end portion, said portions being joined together by a connecting element of low heat conductivity.

7. The apparatus of claim 6, wherein the connecting element is composed of a mixture of a thermoset resin and asbestos, said connecting element being joined to said dip pipe elements by an epoxy resin adhesive.

8. The apparatus of claim 6, wherein one end of the L-shaped end portion is associated with a bushing means inserted in a cup-shaped inner housing which is in turn connected with the main housing, the other end of said L-shaped end portion containing said heat-sensing means.

9. The apparatus of claim 6, wherein the dip pipe is marked to determine its immersion depth as well as the direction of the L-shaped end portion.

10. The apparatus of claim 9, wherein the dip pipe is provided with a plurality of spaced-apart longitudinal grooves and the outer housing is provided with a radially disposed threaded pin, said pin being adapted to engage said longitudinal grooves so that said L-shaped end portion can be aligned at an angle determined by the spacing of said individual grooves.

11. The apparatus of claim 1, wherein the external threads of the outer housing engage the walls of a bore hole provided in a conduit means, the connection between said threads and the bore hole being sealed by a ring gasket.

12. The apparatus of claim 1, wherein the adjusting means is marked to indicate the immersion depth of the L-shaped end portion.

13. The apparatus of claim 1, wherein the adjusting means is a handwheel.

14. An apparatus for measuring the temperature of a medium flowing through a conduit which comprises an outer housing provided at one end with an external thread which is adapted to engage the conduit means and at the other end with a head portion, screw adjustment means rotatably disposed in the head portion of the outer housing said adjustment means being provided with an annular groove, pin means disposed in the head portion of the outer housing at right angles to its longitudinal axis, said pin means tangentially engaging said annular groove, thereby making said adjustment means axially nondisplaceable, dip pipe means disposed within said outer housing, means for securing the dip pipe means against rotational movement relative to said outer housing, said dip pipe means having at one end an external threaded portion which engages the adjustment means for axially displacing said dip pipe means, the other end of said dip pipe means extending out of the outer housing in an L-shaped manner, the end portion of the L-shaped dip pipe being provided with a heat-sensing means, indicator means disposed at the threaded end of the dip pipe means and insulated wires extending through the interior of the dip pipe means and providing communication between the heat sensing means and the indicator means.

15. The apparatus of claim 14, wherein the heat sensing means is secured to the end portion of the L-shaped dip pipe means by a neutral adhesive.

16. The apparatus of claim 14, wherein the threaded end of the dip pipe means is provided with a stopper means which contains the appropriate perforations to receive said insulated wires.

17. The apparatus of claim 14, wherein the dip pipe means is provided with at least one longitudinal groove on its outer surface, said groove adapted to engage a threaded pin disposed in the inner wall of the outer housing.

18. The apparatus of claim 14, wherein the diameter of the dip pipe is reduced in the area of the L-shaped end portion.

19. The apparatus of claim 14, wherein an annular gap is maintained between the dip pipe means and the outer housing.

20. The apparatus of claim 14, disposed in the wall of a conduit means.

References Cited

UNITED STATES PATENTS

| | | | |
|---|---|---|---|
| 1,675,210 | 6/1928 | Campbell et al. | 136—230X |
| 2,625,573 | 1/1953 | Connell | 73—359X |
| 2,981,106 | 4/1961 | Knudsen et al. | 73—36X |

LOUIS R. PRINCE, Primary Examiner

F. SHOON, Assistant Examiner

U.S. Cl. X.R.

73—349; 136—230